US 8,515,203 B2

(12) United States Patent
Yang et al.

(10) Patent No.: US 8,515,203 B2
(45) Date of Patent: Aug. 20, 2013

(54) IMAGE PROCESSING METHOD AND IMAGE PROCESSING MODULE FOR A POINTING DEVICE

(75) Inventors: Shu-Sian Yang, Hsinchu County (TW); Hsin-Chia Chen, Hsinchu County (TW); Tzung-Min Su, Hsinchu County (TW)

(73) Assignee: Pixart Imaging Inc., Hsinchu County (TW)

( * ) Notice: Subject to any disclaimer, the term of this patent is extended or adjusted under 35 U.S.C. 154(b) by 302 days.

(21) Appl. No.: 13/080,349

(22) Filed: Apr. 5, 2011

(65) Prior Publication Data

US 2011/0181508 A1 Jul. 28, 2011

Related U.S. Application Data

(63) Continuation-in-part of application No. 12/820,967, filed on Jun. 22, 2010, now Pat. No. 8,374,459.

(60) Provisional application No. 61/220,559, filed on Jun. 25, 2009.

(30) Foreign Application Priority Data

Apr. 14, 2010 (TW) .............................. 99111695 A
Nov. 26, 2010 (TW) .............................. 99141112 A

(51) Int. Cl.
*G06K 9/40* (2006.01)

(52) U.S. Cl.
USPC ........................................ 382/274

(58) Field of Classification Search
USPC ............... 345/77, 163; 348/211.7, 673, 687, 348/E13.069, E11.009, E11.011, E9.035, 348/E9.036, E5.034, E5.035, E5.038, E5.119; 382/274; 463/37
See application file for complete search history.

(56) References Cited

U.S. PATENT DOCUMENTS

| | | | | |
|---|---|---|---|---|
| 4,371,895 | A | * | 2/1983 | Koga ........................ 375/240.14 |
| 6,097,832 | A | * | 8/2000 | Guillotel et al. .............. 382/107 |
| 2006/0023970 | A1 | * | 2/2006 | Wang ........................... 382/312 |

FOREIGN PATENT DOCUMENTS

| | | | | |
|---|---|---|---|---|
| JP | 10051788 | A | * | 2/1998 |
| JP | 2006041943 | A | * | 2/2006 |

* cited by examiner

*Primary Examiner* — Gregory F Cunningham
(74) *Attorney, Agent, or Firm* — Morris Manning & Martin LLP; Tim Tingkang Xia, Esq.

(57) ABSTRACT

An image processing method is applicable to a pointing device. The pointing device generates a displacement signal by moving relative to a working surface and detecting an image of a part of the working surface. The method includes the following steps. A first original image is obtained. The first original image is uniformly divided into a plurality of blocks. A block brightness value of each block is adjusted. A complexity signal representing a plurality of gradient values of each block is generated. The blocks are sequentially adjusted according to the adjusted block brightness value and complexity signal, so as to generate a first adjusted image corresponding to the first original image.

14 Claims, 3 Drawing Sheets

IMAGE PROCESSING METHOD AND IMAGE PROCESSING MODULE FOR A POINTING DEVICE

CROSS-REFERENCE TO RELATED APPLICATIONS

This non-provisional application claims priority under 35 U.S.C. §119(a) on Patent Application No. 099141112 filed in Taiwan, R.O.C. on Nov. 26, 2010 and Patent Application No. 099111695 filed in Taiwan, R.O.C. on Apr. 14, 2010, the entire contents of which are hereby incorporated by reference. This application is also a continuation-in-part patent application of U.S. application Ser. No. 12/820,967 filed on Jun. 22, 2010, which itself claims priority under 35 U.S.C. §119(e) on U.S. Provisional Patent Application No. 61/220,559 filed in the United States on Jun. 25, 2009, the entire contents of which are hereby incorporated by reference.

BACKGROUND OF THE INVENTION

1. Field of Invention

The present invention relates to an image processing method and a module thereof, and more particularly to a method for processing a high dynamic range image (HDRI) and a module thereof.

2. Related Art

In current daily life, an image capturing device is widely used. The image capturing device captures an image with a light sensor and converts the image into digital signals, which are then stored. A variety of applications may be designed by means of the digital signals captured by the image capturing device in combination with a digital image processing technology.

The image capturing device is also applicable to a general pointing device, for example, an image mouse. The pointing device may emit a light ray to a surface, and the image capturing device captures a light ray reflected from the surface. After appropriate sampling, the pointing device may obtain images at multiple time points. A digital processor in the pointing device may compare images at adjacent time points, so as to determine a direction and distance of movement of the pointing device based on a brightness difference of pixels in the images.

However, when the image capturing device captures the light ray reflected from the surface, the reflected light ray may have unevenly distributed brightness because of the uneven brightness of the emitted light ray or a surface feature, so brightness of a large part of regions of the image may be too high, and the brightness of the other parts may be too low. The image with many pixels gathered at bright portions and dark portions is referred to as the HDRI. In the HDRI, the portions that are too bright and too dark lose original features of the image. In other words, when the image captured by the pointing device is the HDRI, a deviation occurs when the pointing device determines a direction and distance of movement because of a loss of details of the image.

SUMMARY OF THE INVENTION

Accordingly, the present invention is directed to an image processing method applicable to a pointing device. The pointing device generates a displacement signal by moving relative to the working surface and detecting an image of a part of the working surface. The method comprises the following steps. A first original image is obtained. The first original image is uniformly divided into a plurality of blocks. A block brightness value of each block is adjusted. A complexity signal representing a plurality of gradient values of each block is generated. The blocks are sequentially adjusted according to the adjusted block brightness values and complexity signals, so as to generate a first adjusted image corresponding to the first original image.

An image processing module is applicable to a pointing device. The pointing device generates a displacement signal by moving relative to the working surface and detecting an image of a part of the working surface.

The image processing module comprises a plurality of image sensor units and a processor. The plurality of image sensor units is used to obtain the first original image. The processor uniformly divides the first original image into a plurality of blocks, and sequentially process the blocks, so as to adjust the block brightness value of each block. In addition, the processor generates a complexity signal representing a plurality of gradient values of each block. Next, the block brightness value and complexity gradient value of a corresponding block are adjusted according to the complexity signal, so as to generate a first adjusted image corresponding to the first original image.

The block is a rectangular grid. In addition, the plurality of gradient values is selected from a horizontal gradient value, a vertical gradient value, and a diagonal gradient value.

With the image processing method and the image processing module of the present invention, brightness distribution may be adjusted, and details of the original image may be maintained. Therefore, the pointing device applicable to the present invention still may precisely determine a direction and distance of movement in an uneven light environment.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed features and advantages of the present invention are described below in great detail through the following embodiments, the content of the detailed description is sufficient for those skilled in the art to understand the technical content of the present invention and to implement the present invention there accordingly. Based upon the content of the specification, the claims, and the drawings, those skilled in the art can easily understand the relevant objectives and advantages of the present invention.

Figure 1:
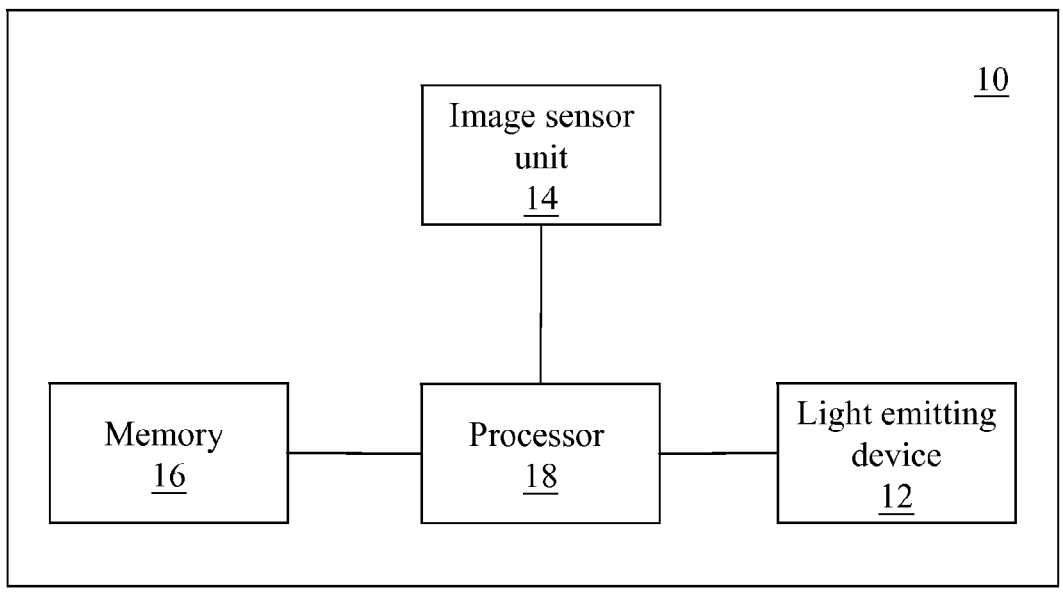
FIG. 1 is a block diagram of an image processing module.

FIG. 1 is a block diagram of an image processing module. Referring to FIG. 1, an image processing module 10 comprises a light emitting device 12, multiple image sensor units 14, a memory 16, and a processor 18.

The light emitting device 12 emits a light ray to a working surface. The light emitting device 12 may be a light-emitting diode or a laser light emitting device. The light ray is reflected after being emitted to the working surface, and is received by the multiple image sensor units 14.

The multiple image sensor units 14 receive the reflected light at a fixed period or a non-fixed period. The multiple image sensor units 14 may be a charge-coupled device (CCD)

or a complementary metal-oxide-semiconductor (CMOS), and each of the multiple image sensor units 14 represents a pixel. The multiple image sensor units 14 may generate multiple image signals after receiving the reflected light and analog-to-digital conversion thereof.

The memory 16 may be used to store the multiple image signals. The processor 18 may be a microprocessor, a microcontroller, an application-specific integrated circuit (ASIC), or a field programmable gate array (FPGA). The processor 18 may be used for the light emitting device 12, the image sensor unit 14, and the memory 16, and also may be used to execute a method for adjusting photographic parameters of the present invention.

In the present invention, the processor 18 may perform image processing on the multiple image signals, and one image (referring to as a first original image hereinafter) of the multiple image signals is taken as an example. The processor 18 uniformly divides the first original image into multiple blocks. The processor 18 respectively adjusts a block brightness value of each block, and generates a complexity signal representing multiple gradient values of each block. After adjusting the blocks, the processor 18 combines the blocks to generate a first adjusted image.

Figure 2:
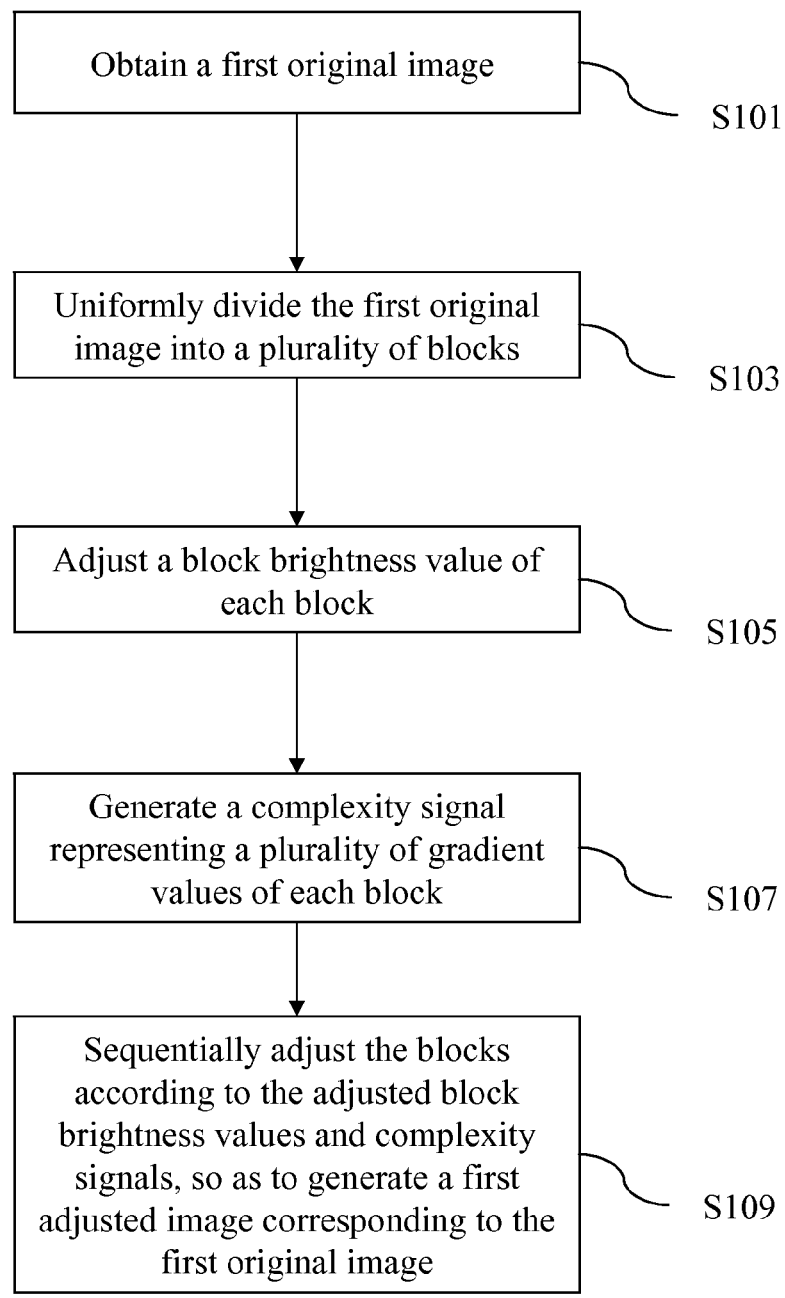
FIG. 2 is a flow chart of an image processing method according to a first embodiment of the present invention.

FIG. 2 is a flow chart of an image processing method according to a first embodiment of the present invention. Referring to FIG. 2, the method is applicable to a pointing device. The pointing device may detect an image signal of a part of a working surface when moving relative to the working surface, process the image signal using the image processing method, and generate a movement signal according to the processed image signal.

In Step S101, the light emitting device 12 emits a light ray to a working surface, and the multiple image sensor units 14 receive a reflected light, so as to obtain a first original image.

In Step S103, the processor 18 uniformly divides the first original image into a plurality of blocks, and each block is a rectangle or a grid. The processor 18 may average brightness of all pixels in the blocks, and obtain block brightness.

It is assumed that the block brightness of a 2×2 grid pixel is $$\begin{bmatrix} a_1 & a_2 \\ a_3 & a_4 \end{bmatrix},$$

so block brightness $c_1$ is $$c_1 = \frac{a_1 + a_2 + a_3 + a_4}{4}.$$

For example, the block brightness of the grid pixel is $$\begin{bmatrix} 40 & 44 \\ 46 & 50 \end{bmatrix},$$

and the block brightness is $c_1=45$.

In Step S105, the processor 18 adjusts the block brightness of each block according to a tone curve mapping. The tone curve mapping may be a gamma curve. The processor 18 may perform the above adjustment using a look-up table or an algorithm conversion method.

For example, during conversion using a brightness conversion function, it is assumed that a relationship between an input value and an output value in the following sections of the tone curve mapping is as follows: if the input value is between 40 and 42, the output value is 50; if the input value is between 43 and 45, the output value is 51; if the input value is between 46 and 47, the output value is 52; if the input value is between 48 and 49, the output value is 53; and if the input value is between 50 and 51, the output value is 54. In other words, if the input block brightness $c_1=45$, the output value is 51.

In Step S107, the processor 18 generates a complexity signal representing a plurality of gradient values of each block. The gradient values of the blocks are a horizontal gradient value, a vertical gradient value, and a diagonal gradient value. The processor 18 may perform linear transformation on numerical values in the blocks, so as to obtain multiple corresponding gradient values.

Taking a grid with a size of 2×2 as an example, it is assumed that the block brightness of the 2×2 grid pixel is $$\begin{bmatrix} a_1 & a_2 \\ a_3 & a_4 \end{bmatrix},$$

the horizontal gradient value is defined as $a_1+a_3-(a_2+a_4)$, the vertical gradient value is defined as $a_1+a_2-(a_3+a_4)$, and the diagonal gradient value is defined as $a_1+a_4-(a_2+a_3)$.

It is assumed that a 2×2 grid is represented as $$\begin{bmatrix} 40 & 44 \\ 46 & 50 \end{bmatrix},$$

the horizontal gradient value is $g_1=40+46-(44+50)=-8$, the vertical gradient value is defined as $g_2=40+44-(46+50)=-12$, and the diagonal gradient value is defined as $g_3=40+50-(44+46)=0$.

In Step S109, the processor 18 sequentially adjusts the blocks according to the adjusted block brightness values and multiple complexity signals, so as to generate a first adjusted image corresponding to the first original image. An inverse conversion of the linear transformation may be performed on the numerical values in the blocks, and a reconstructed block image is obtained according to the multiple gradient values and the adjusted block brightness value.

Taking a 2×2 grid as an example, the block brightness value adjusted according to the tone curve mapping is $c_2$, the horizontal gradient value is $g_1=a_1+a_3-(a_2+a_4)$, the vertical gradient value is defined as $g_2=a_1+a_2-(a_3+a_4)$, and the diagonal gradient value is defined as $g_3=a_1+a_4-(a_2+a_3)$. Four unknown numbers $a_1$, $a_2$, $a_3$, and $a_4$ may be obtained according to the above four equations. In this example, the reconstructed block images are $$a_1 = c_2 + \frac{g_1+g_2+g_3}{4}, a_2 = c_2 + \frac{-g_1+g_2-g_3}{4}, a_3 = c_2 + \frac{g_1-g_2-g_3}{4},$$
$$\text{and } a_4 = c_2 + \frac{-g_1-g_2+g_3}{4}.$$

Similarly, in a 3×3 grid, the numerical values in the grid may be calculated again in this spirit.

Taking the above grid as an example, each numerical value in the original grid may be calculated according to the horizontal gradient value $g_1=-8$, the vertical gradient value $g_2=-12$, and the diagonal gradient value $g_3=0$. According to the calculation method described above, it may be obtained that in a 2×2 grid the numerical values at upper left, upper right, lower left, and lower right are respectively $$a_1 = 51 + \frac{-8 + (-12) + 0}{4} = 46, a_2 = 51 + \frac{-(-8) + (-12) - 0}{4} = 50,$$

$$a_3 = 51 + \frac{(-8) - (-12) - 0}{4} = 52, \text{ and } a_4 = 51 + \frac{-(-8) - (-12) + 0}{4} = 56.$$

In other words, a recombined 2×2 grid is $$\begin{bmatrix} 46 & 50 \\ 52 & 56 \end{bmatrix}.$$

In order to avoid the loss of details of the image after passing the tone curve mapping, in this step, a detail enhancement parameter may be generated according to the complexity signal, and the multiple gradient values are fine tuned according to the detail enhancement parameter.

Description will be made by taking the above grid as an example, the horizontal gradient value, vertical gradient value, and diagonal gradient value may be multiplied by a constant for fine-tuning. The gradient values may be dynamically adjusted according to a difference between the first brightness and the second brightness. For example, when the difference between the first brightness and the second brightness is large, the gradient values may be properly increased; and when the difference between the first brightness and the second brightness is small, the gradient values remain unchanged.

Similarly in the above grid, it is assumed that the horizontal gradient value, the vertical gradient value, and the diagonal gradient value are multiplied by 2, the fine-tuned horizontal gradient value is $g_1=-8\times2=-16$, the vertical gradient value is $g_2=-12\times2=-24$, and the diagonal gradient value is $g_3=0$. According to the above calculation method, it may be obtained that in a 2×2 grid, the numerical values at upper left, upper right, lower left, and lower right are respectively $$a_1 = 51 + \frac{-16 + (-24) + 0}{4} = 41, a_2 = 51 + \frac{-(-16) + (-24) - 0}{4} 49,$$

$$a_3 = 51 + \frac{(-16) - (-24) - 0}{4} = 53,$$

$$\text{and } a_4 = 51 + \frac{-(-8) - (-12) + 0}{4} = 61.$$

In other words, the fine tuned and recombined 2×2 grid is $$\begin{bmatrix} 41 & 49 \\ 53 & 61 \end{bmatrix}.$$

The processor 18 may generate a reconstructed block image for each block according to the above method, and obtain the first adjusted image by combining the reconstructed block images.

Because the processor 18 only processes one block, a capacity of the memory 16 only needs to correspond to a size of a corresponding block, and the whole picture does not need to be stored. Therefore, complexity of hardware may be significantly reduced by adopting the method of the present invention.

Figure 3:
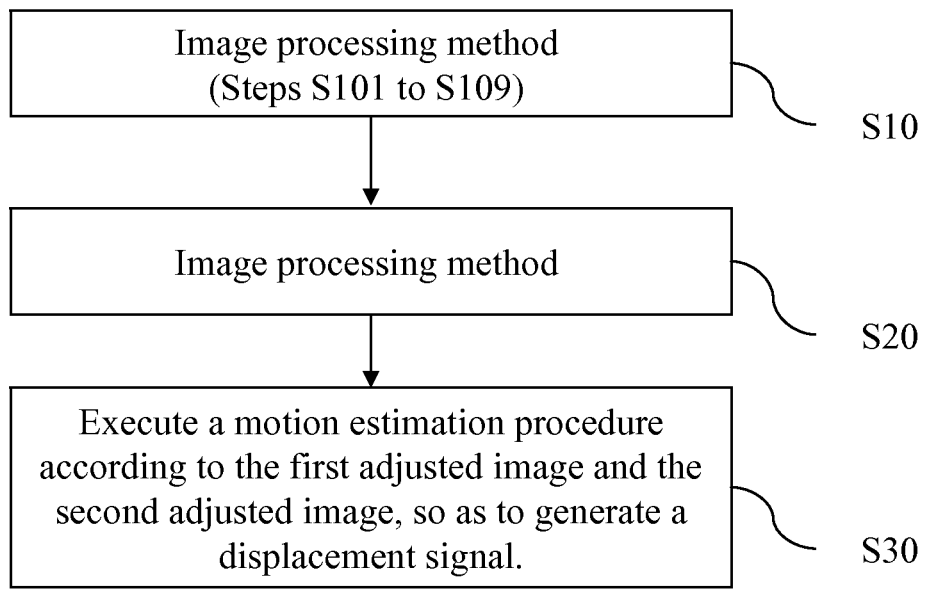
FIG. 3 is a flow chart of an image processing method according to a second embodiment of the present invention.

FIG. 3 is a flow chart of an image processing method according to a second embodiment of the present invention.

Step S10 comprises Steps S101 to S109. In other words, in Step S10, after the first original image is obtained, all steps in FIG. 2 are performed, and the first adjusted image is obtained.

Step S20 is similar to Step S10. In Step S20, after a certain period of time after Step S10, a second original image is obtained, and a second adjusted image is obtained with the same steps.

In Step S30, the processor 18 may execute a motion estimation procedure according to the first adjusted image and the second adjusted image, so as to generate a displacement signal. The motion estimation procedure processes the first adjusted image and the second adjusted image. The processor 18 finds an image feature from the first adjusted image, and searches for a recognition result similar to the image feature in the second adjusted image. The processor 18 may generate the displacement signal to represent an amount of movement of the pointing device according to a direction and distance of movement between the recognition result and the image feature.

With the image processing method and the image processing module of the present invention, brightness distribution may be adjusted, and details of the original image may be maintained. Therefore, the pointing device applicable to the present invention still may precisely determine a direction and distance of movement in an uneven light environment.

What is claimed is:

1. An image processing method, applicable to a pointing device, wherein the pointing device generates a displacement signal by moving relative to a working surface and detecting an image signal of a part of the working surface, and the method comprises:
   successively obtaining a first original image and a second original image;
   uniformly dividing the first original image into a plurality of first blocks and dividing the second original image into a plurality of second blocks;
   adjusting a block brightness value of each of the first blocks and the second blocks;
   generating a complexity signal representing a plurality of gradient values of each of the first blocks and the second blocks according to the corresponding block brightness value;
   adjusting each of the first blocks according to the adjusted corresponding block brightness value and the corresponding complexity signal of the first original image, so as to generate a first adjusted image corresponding to the first original image;
   adjusting each of the second blocks according to the adjusted corresponding block brightness value and the corresponding complexity signal of the second original image, so as to generate a second adjusted image corresponding to the second original image; and
   executing a motion estimation procedure according to the first adjusted image and the second adjusted image, so as to generate the displacement signal.

2. The image processing method according to claim 1, wherein the first and second blocks are rectangular grids.

3. The image processing method according to claim 2, wherein the plurality of gradient values are selected from a horizontal gradient value, a vertical gradient value, and a diagonal gradient value.

4. The image processing method according to claim 1, wherein the gradient values are obtained by performing a linear transformation on a plurality of numerical values of the first blocks and the second blocks.

5. The image processing method according to claim 4, wherein a step of adjusting each of the first blocks, so as to generate the first adjusted image comprises:
   generating a reconstructed block image for each of the first blocks according to the block brightness value and the plurality of gradient values of the first blocks; and
   combining the plurality of the reconstructed block images to obtain the first adjusted image.

6. The image processing method according to claim 5, further comprising:
   inversely converting the block brightness value and the plurality of gradient values of the first blocks according to the linear transformation, so as to generate the reconstructed block image.

7. The image processing method according to claim 1, further comprising:
   generating a detail enhancement parameter according to the complexity signal; and
   fine-tuning the plurality of gradient values according to the detail enhancement parameter.

8. An image processing module, applicable in a pointing device, wherein the pointing device generates a displacement signal by moving relative to a working surface and detecting an image of a part of the working surface, and the image processing module comprises:
   a plurality of image sensor units, used for obtaining original images; and
   a processor, used for uniformly dividing each of the original images into a plurality of blocks, sequentially processing the plurality of blocks, to adjust a block brightness value of each of the blocks of each of the original images, generating a complexity signal representing a plurality of gradient values of each of the blocks of each of the original images according to the corresponding block brightness value, and adjusting the block brightness value and the plurality of gradient values of each of the blocks of each of the original images according to the corresponding complexity signal, so as to generate adjusted images corresponding to the original images,
   wherein the processor executes a motion estimation procedure according to the adjusted images, so as to generate the displacement signal.

9. The image processing module according to claim 8, wherein the blocks are rectangular grids.

10. The image processing module according to claim 9, wherein the plurality of gradient values are selected from a horizontal gradient value, a vertical gradient value, and a diagonal gradient value.

11. The image processing module according to claim 8, wherein the processor is used for linearly converting a plurality of numerical values of the plurality of blocks, so as to obtain the plurality of corresponding gradient values.

12. The image processing module according to claim 11, wherein the processor generates a reconstructed block image for each of the blocks according to the block brightness value and the plurality of gradient values of each of the blocks, and combines the plurality of reconstructed block images to obtain the adjusted image.

13. The image processing module according to claim 12, wherein the processor inversely converts the block brightness value and the plurality of gradient values of each of the blocks according to the linear transformation, so as to generate the reconstructed block image.

14. The image processing module according to claim 8, wherein the processor generates a detail enhancement parameter according to the complexity signal, and fine tunes the plurality of gradient values according to the detail enhancement parameter.

* * * * *